March 21, 1967
R. H. HARPER
3,309,762
METHOD FOR MAKING MOLDED SANDWICH TUBULAR SEPTIC
TANKS AND OTHER MOLDED TUBULAR ARTICLES
Filed March 8, 1963
5 Sheets-Sheet 1
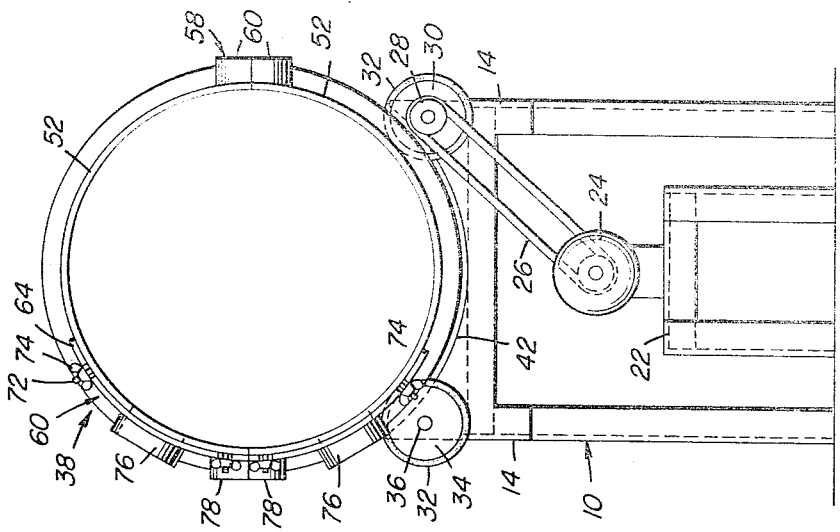
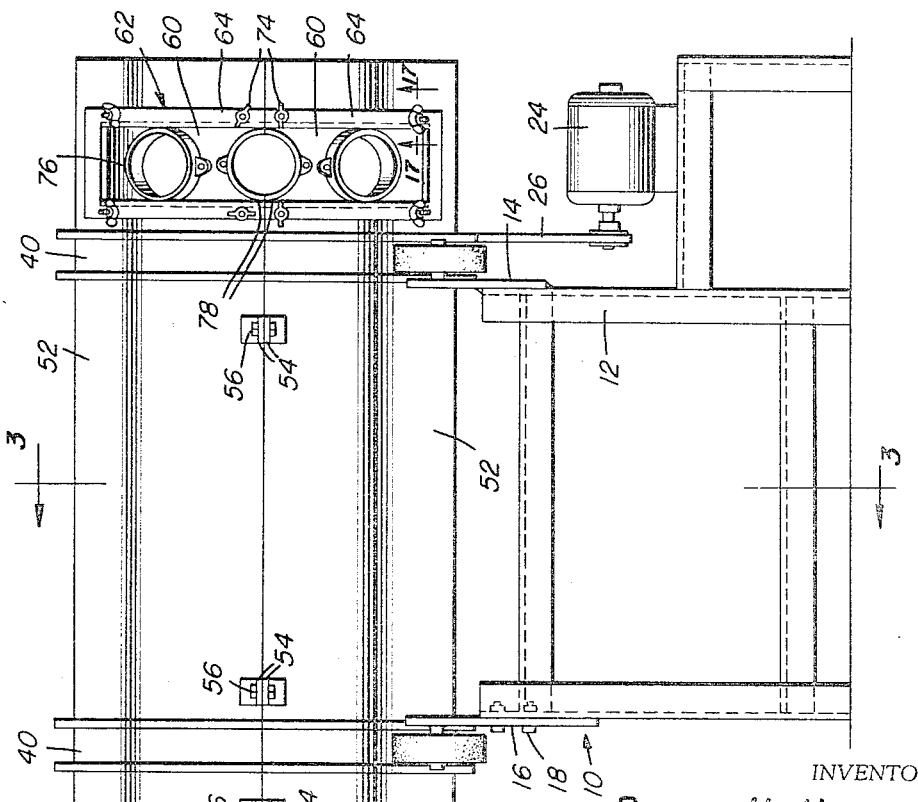
INVENTOR
Roscoe H. Harper
BY Gustave Miller
ATTORNEY

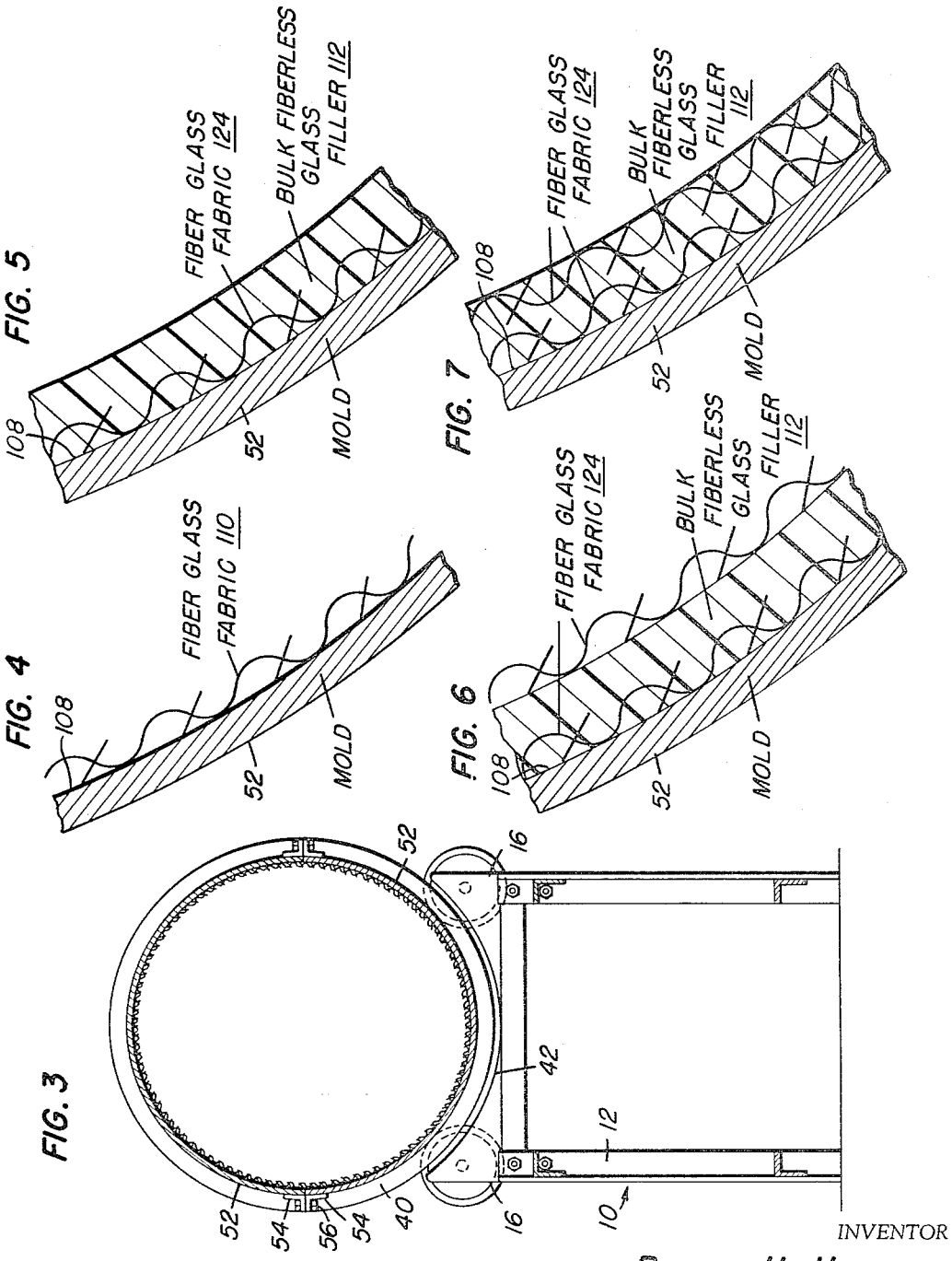

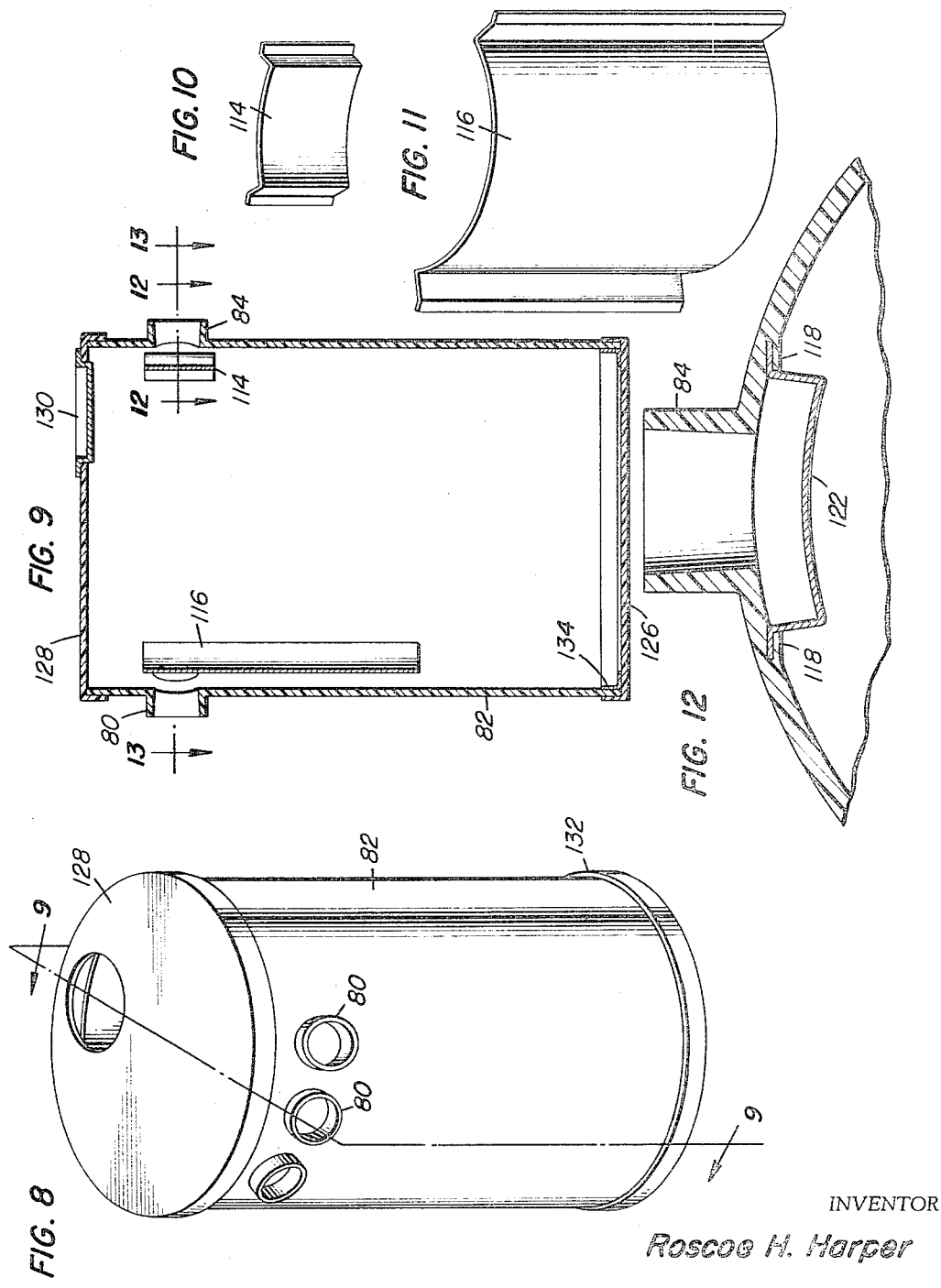

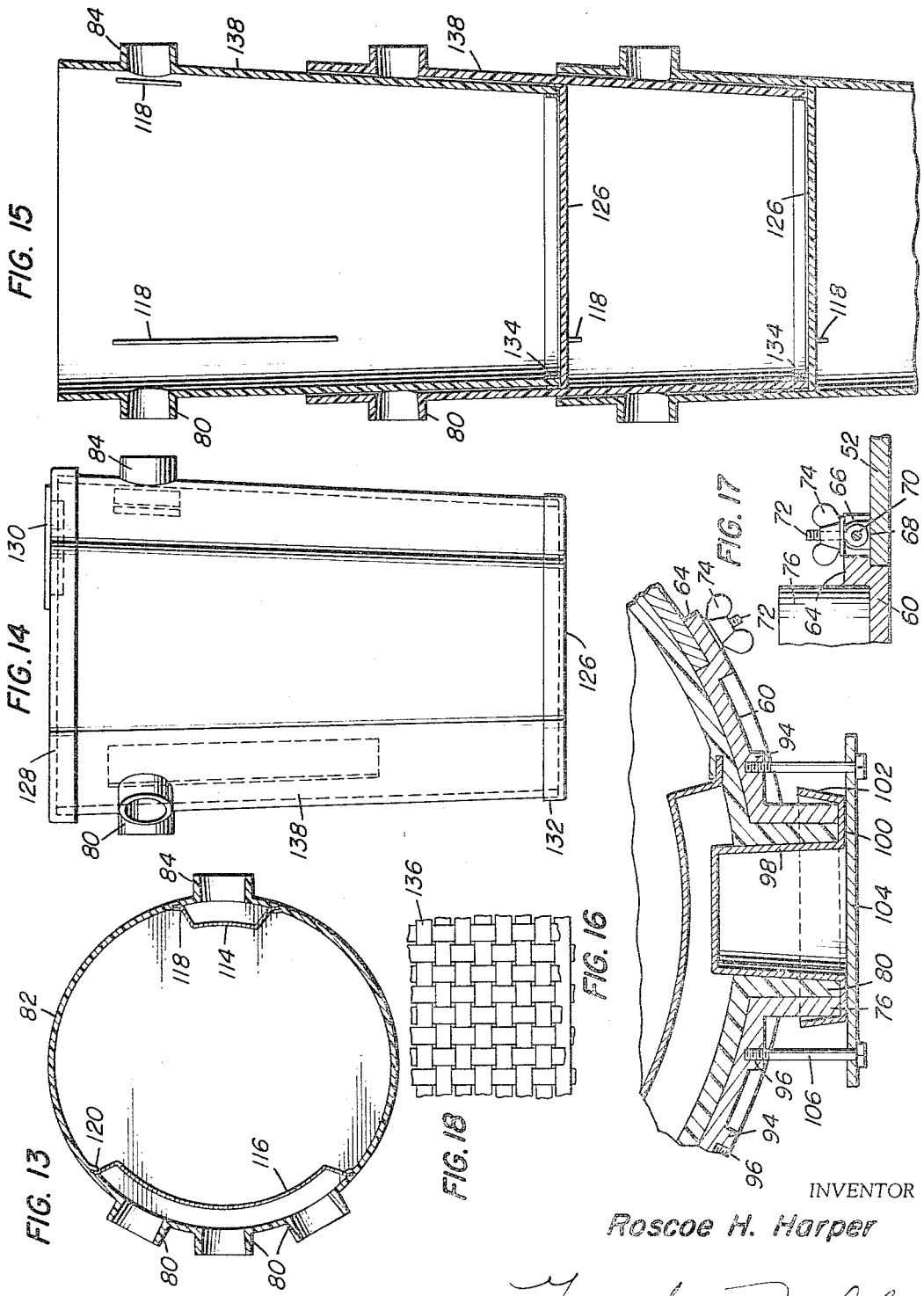

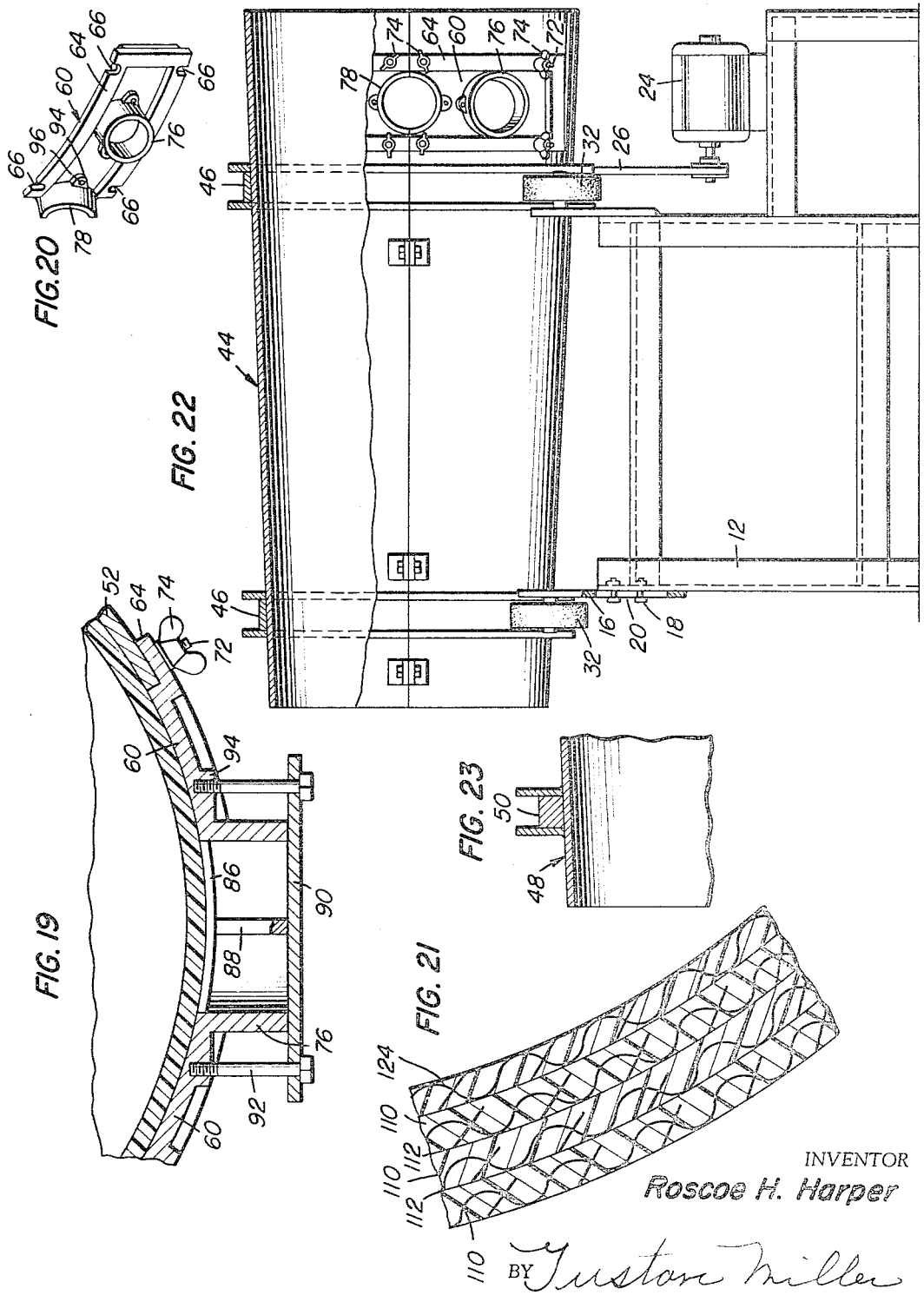

United States Patent Office 3,309,762
Patented Mar. 21, 1967

3,309,762
METHOD FOR MAKING MOLDED SANDWICH TUBULAR SEPTIC TANKS AND OTHER MOLDED TUBULAR ARTICLES
Roscoe H. Harper, Lewistown, Pa., assignor to Harper Industries, Inc., Lewistown, Pa., a corporation of Pennsylvania
Filed Mar. 8, 1963, Ser. No. 263,989
5 Claims. (Cl. 29—157)

This invention relates to a method of making a molded sandwich tubular septic tank and other molded tubular articles.

It is an object of this invention to provide a method for making a new and improved anti-corrosion septic tank or tubular article wherein the tank or tubular article is anti-corrosive, extremely light in weight, and of greater strength than customary.

A further object of this invention is to provide an improved method of making a reinforced fiberglass tank which is anti-corrosive, offers superior resistance to most corrosive gases, fumes and liquids, including strong solvents, alkalis and oxidizing agents.

Still a further object is to provide an improved method of making a tubular article which is molded in the form of a sandwich consisting principally or entirely of fiberglass and thermo-setting polyester resin, wherein the sandwich consists generally of inner and outer layers of fiberglass mat or fabric with a filler that is fiberglass and may be of hammermilled fiberglass that has been milled through an eighth inch, and then through a sixteenth inch mesh, or may be any other suitable mineral or vegetable fiberless filler, and wherein both the filler and the mat or fabric have been pre-wet with the polyester resin and then molded in the apparatus of this invention in accordance to the method of this invention to provide a lightweight corrosion resistant septic tank, either in cylindrical or tapered form, or to provide any other tubular object such as a pipe.

Still a further object of this invention is to provide an improved method of making a septic tank which is corrosion resistant and is of such light weight that it can be readily handled by one or two men, wherein a standard size 750 gallon tank weighs approximately 150 pounds as contrasted with the same size septic tank made of concrete weighing 2½ tons, wherein it may be stored, shipped and placed at a very substantially lower cost than with a comparable concrete tank.

Still a further object of this invention is to provide an improved method of making a septic tank having a plurality of outlet ports which eliminate the necessity of the conventional distribution box normally provided with the conventional septic tank.

Still a further object of this invention is to provide an improved method for molding a cylindrical or tapered object such as a pipe or tank of this invention.

Still a further object of this invention is to provide an impoved method of making a septic tank that is corrosion-proof, wherein the tubular object or tank may be in the form of a single sandwich consisting of two layers with one filler therebetween, or may be in the form of a multi-deck sandwich with a number of successive layers and a filler between each adjacent pair of layers, all assembled in accordance with the method of this tank and finally solidified into the final object.

Still a further object of this invention is to provide an improved method for molding a tubular cylindrical or tapered object which may thereafter be readily converted into a tank of any nature or the special improved septic tank of this invention.

Still a further object of this invention is to provide an improved method of making a corrosion-resistant septic tank eliminating the need for a separate distribution box in the drain field, which tank may be made frusto-conical or tapered in shape so that a plurality of tanks may be nested for storage and shipping purposes, wherein each tank is provided with means for readily attaching suitable baffles therein and suitable caps thereon in location after the tank is installed in the drain field, wherein the main ingredient in forming all parts of the tank, the baffles, the bottom and the cap are fiberglass and polyester resin utilized according to the method of this invention on the apparatus of this invention in forming the tank of this invention.

Although the same principal ingredients of fiberglass and thermosetting polyester resin have been used in making tanks and tubular articles in the prior art, such as disclosed in Patents Nos. 2,977,268, 2,977,269, 3,010,602, and others, the method of this invention differs from such prior art in not using the pressure molding systems therein disclosed but using heat and centrifugal force of varying degrees for molding the material in a suitable rotary mold, varying the speed of rotation and turning the heat on and off throughout the several steps of the method until a solidified finished product is formed.

With the above and related objects in view, this invention consists in the details of construction and combination of parts, as will be more fully understood from the following description, when read in conjunction with the accompanying drawings, in which:

FIG. 1 is a side elevational view of a mold for making a cylindrical tubular object with flanged ports therein, mounted on a rotating mandrel in operating position.

FIG. 2 is a front end elevational view of FIG. 1.

FIG. 3 is a sectional view on line 3—3 of FIG. 1.

FIG. 4 is an enlarged fragmentary sectional view showing the first step of applying fiberglass fabric to the inside of the mold.

FIG. 5 is a similar fragmentary sectional view showing the step where bulk fiberglass filler has been added thereto.

FIG. 6 shows a similar fragmentary section with a second layer of fiberglass fabric applied over the bulk fiberglass filler of the previous step.

FIG. 7 is a similar fragmentary view in the final form.

FIG. 8 is a perspective view of a cylindrical form of septic tank made in accordance with this invention.

FIG. 9 is a sectional view on line 9—9 of FIG. 8.

FIG. 10 is a perspective view of a small size removable inlet baffle.

FIG. 11 is a perspective view of a large size removable outlet baffle.

FIG. 12 is a sectional view on an enlarged scale on line 12—12 of FIG. 9, showing both inlet and outlet baffles in position.

FIG. 13 is a sectional view on line 13—13 of FIG. 9 through the inlet and outlet ports and the baffles in position thereover.

FIG. 14 is a side elevational view of a tapered form of septic tank, with interior parts shown in dash outlines.

FIG. 15 is a sectional view through a plurality of tapered nested tanks, the cover caps and readily attachable baffles being left off to permit nesting.

FIG. 16 is an enlarged sectional fragmentary view of an outlet port-forming attachment for the mold, and including the baffle forming mold in position for forming baffle holding slots in the finished article.

FIG. 17 is a fragmentary sectional view of the mold attachment securing means on line 17—17 of FIG. 1.

FIG. 18 is an elevational fragmentary view of basket-woven fiberglass strips used in making the cover cap.

FIG. 19 is an enlarged sectional view of a mold attachment plug for eliminating a flanged port in the tank, when such is desired.

FIG. 20 is a perspective view of a flanged port-forming mold part.

FIG. 21 is a fragmentary sectional view through a tubular article made according to this invention in the form of a four-decker molded sandwich with three interposed fillers.

FIG. 22 is a side elevational view of a tapered mold mounted on a mandrel with a pair of the wheels in adjusted position.

FIG. 23 is a fragmentary sectional view of a tapered mold having a built up trackway eliminating the need for adjustability in the mandrel.

There are two principal ingredients utilized in this invention as raw material for the finished tubular article or septic tank made according to this invention. One principal ingredient is fiberglass which is used in the form of a mat or fabric, as well as in a form of a strip for securing the bottom wall of a tank thereto and in the form of strips assembled in the basket weave and utilized in making a cover cap for the septic tank of this invention, and also in chopped form in making the port flanges. The same fiberglass or any other suitable mineral fiber, synthetic fiber, vegetable fiber, or a combination of any or all of these glass or other fibers is hammermilled through one-eighth and then through one-sixteenth inch screens to provide a fiberglass filler. In every case, the fiberglass in every form such as a mat or strip of basket woven material is pre-wet with thermosetting polyester resin.

The resin comprises any suitable thermosetting resin adapted to be set at temperatures above room temperature. It is preferred that a resin be employed that will set at about 200–220° F. Resins adaptable to the purposes herein described are well known to the art, and in general, high temperature resistant thermosetting resins of the type usually known as polyester resin, such as epoxy resins or styrene-phthalic anhydride condensation products, may be employed together with suitable setting agents adapted to control setting temperature, all as is well known in the art.

In every case as used in the specification and the claims, it will be understood that when chopped fiberglass, fiberglass fabric or mat, strip, or basket weave is referred to as being pre-wet, or the filler is referred to as being pre-wet, that it is pre-wet with such a thermosetting polyester resin.

There is shown at 10 a mandrel consisting of a suitable framework 12 having two fixed standards 14 at one end thereof and two adjustable standards 16 at the other end thereof, the standard 16 being adjusted in position by means of bolts and nuts 18 extending through slots 20 in the standard 16 and into holes in the framework 12. Supported on the bench 22 extending from one side of framework 12 is a variable speed electric motor 24 connected by a pulley belt 26 to a pulley 28 for rotating one of the wheels 30; the wheel 30 is provided with a solid rubber tire 32. Similar wheels, 34, each having a similar rubber tire 32, are journaled on axles 36 supported on each of the standards 14 and 16.

A tank forming mold 38 is shown as cylindrical, and is provided with two spaced apart angle iron tracks 40 by which the mold 38 is cradled on the four wheels 30 and 34, the framework 12 being recessed at 42, complementary to the circumference of the smallest mold to be cradled on the wheels. As thus cradled on the wheels 32, the mold 38 may be rotatable about a horizontal axis at the desired speed by means of the variable speed motor 24.

When using a mold that is tapered or frusto-conical in shape, such as shown at 44 in FIG. 22, with the track 46 closely adjacent the tapered sides of the mold, the standards 16 are adjusted by loosening the bolts 18 and raising the wheels 34 thereon the proper distance so that the mold 44 when rotated will rotate about its longitudinal axis. Alternatively, a tapered mold 48 may have the track on its smaller end built up as at 50 so that the tracks at both ends have the same diameter in which case the standard 16 either need not be adjusted or may not be adjustable at all. Thus, the mold may be cylindrical as at 38, or tapered as at 44 or 48, and is open at both ends and, of course, is of an appropriate diameter and length in accordance to the product or article to be made thereby, but other than the difference in being tapered or cylindrical, the construction of either mold is identical.

Each mold is made of two separate halves 52 detachably secured together as by bolts and nuts 56 secured through complementary apertured cleats 54 whereby the two mold halves may be readily separated to remove the finished article therefrom. As thus throughout described, the molds may be used for making a cylindrical or tapered type of a length and diameter determined by the length and diameter of the molds and it has been found practical with appropriate size molds to make tubular articles varying from sixteen inches to ten feet in diameter, and up to twenty feet in length.

However, this invention contemplates making tubular articles with flanged port mold portions particularly for use in making up septic tanks and for this purpose, there is a single flanged port mold 58 for use in molding a flanged port on one side of the tubular article being molded. This flanged port mold 58 consists of two semi-circular flange mold halves 60, one on each mold half 52 and located so that they complement each other when the mold halves 52 are assembled into the mold.

On the opposite side, each mold half is provided with a complementary circumferentially extended slot within which is secured one of a pair of complementary flange forming mold halves 60 as separately illustrated in FIG. 20. These flange forming mold halves 60, when in position as at 62, make it possible to mold three flanged ports 80 on the tubular article 82. Each flange forming mold half 60, shaped as shown in FIG. 20, has the same circumference as that of the mold half in which it is used and is provided with an offset edge 64 provided with four edge recesses 66 to fit about properly positioned pairs of apertured bosses 68 through which extends a pivot 70 for a bolt 72 on which is threaded a wing nut 74. This permits quick removal of the mold halves 60 by loosening the wing nut 74 a sufficient amount to permit the bolt 72 to turn about its pivot 70 and permit the mold 60 to be removed therefrom. The mold 60 has a complete flange mold 76 and a half complementary flange mold 78 which, when in position on the mold halves 52, serve to form the three flange ports 80 of the tubular article or tank 82, the other single flange port mold 58 serving to mold the flange port 84. Obviously, when completing tank or tubular article 82 from any one of the molds, the flange forming molds 60 are first removed by loosening the wing nut 74 and pivoting the bolt 72 out of the edge recess 66, permitting ready withdrawal of each flange mold 60 from its formed flange ports 80, thus permitting the mold halves 52 to be separated.

With the three exit ports provided by the three flanged ports 80, the septic tank 82 has no need of the conventional separate distribution box, these three flanged ports 80 taking full place of the conventional distribution box. However, when it is desired to form a conventional septic tank with only one exit port, or even a tank or tubular article with no flanged ports, then it is possible to eliminate as many of the flanged openings as desired by means of the construction shown in FIG. 19, wherein a plug 86 curved to the circumference of the mold halves 52 is placed in the selected flange mold 76 and held in proper position therein by a supporting arm 88 from a bridge plate 90 extending across the end of the flange mold 76 and held in position by bolts 92 threaded into apertured bosses suitably provided at 94, either in the mold form 60 of the multiple flange mold 62 or over the single flange port mold 58, thus enabling a special septic tank mold to be used also as a mold for a conventional tank or as a mold for a cylindrical or tapered tubular article with no openings in the side wall thereof, thus cutting down not only expense of mold inventory but also the expense of mold storage space.

However, when forming the flanged ports 80 or 84, a cup-shaped mold 98 is provided having a lip 100 and an annular flange 102. This cup mold 98 is placed within the flange forming molds 58, 76 and 78, so as to provide an annular space of a size and shape within which flanged ports 80 or 84 are molded. The cup-shaped mold 98 is held in position by a bridging plate 104 and bolts 106 extending into the threaded bosses 94.

The method of this invention for forming the tubular article or septic tank 82 of this invention is as follows:

The particular mold desired is first assembled by securing its halves 52 together by means of the bolts 56 through its complementary apertured cleats 54 with the multiple flange port forming mold 62 secured in position. Then, if no flanged ports are desired in the finished article, that is, merely a cylindrical or tapered pipe, each flange port will be covered with a plug 86 secured thereto by bolts 92. If a conventional tank with only a single entry and single exit port is desired, then the two end flanged molds 76 have the plugs 86 placed therein or if the special septic tank of this invention with three exit ports are provided, no plugs 86 are used and instead the mold cups 98 are secured in position as described and illustrated in FIG. 16.

The ingredients used in making a septic tank or tubular article as set forth above are fiberglass mats or fabrics, suitable filler and thermosetting polyester resin as set forth above. With the mat or fabric properly assembled, the mold is first prepared by lining it with a suitable wax mold release forming a thin layer of suitable thickness at 108 on the inner surface of the mold halves 52. The cup molds, of course, will be similarly coated. Next, a first layer of fiberglass fabric or mat 110 pre-wet with the thermosetting polyester resin, is placed about the mold to the approximate shape of the form and simultaneously, the annular space provided between the mold flanges 76 and the flange cups 98 is filled with similarly chopped fiberglass fabric for forming the flanges 80. Preferably, the mold has been rotated to place these flanges 76 at the bottom thereof, it being understood that in every instrument, the fiberglass mat, fabric, chopped fabric or fiberglass in any form used has been pre-wet with the thermosetting polyester resin described above.

After the fabric or mat has been laid out by hand to the desired thickness and shape, the mold is rotated by the variable speed motor 24 momentarily at 120 revolutions per minute to eliminate air pockets between the mat and the mold, and then it is slowed to 60 r.p.m., and the rotating mold is then sprayed with a spray of bulk fiberless filler which is preferably fiberglass that has been hammer-milled through one-eighth and one-sixteenth inch screens. However, any other suitable filler may be used such as fiberglass, wool or any other mineral fiber, synthetic fiber, vegetable fiber, or combination of any or all of these fibers that have been made fiberless by being hammermilled through these screens. Then when the filler has been built up to the desired thickness, the rotating mold is speeded up to a 120 r.p.m. and heat is pumped through the rotating mold and heat from any suitable source, well known and conventional, for just a few moments until the resin and the materials jells while the filler is forced by centrifugal force into the fabric. As soon as it has jelled, the heat is turned off and the rotation stopped whereupon the mold is stopped with the single flanged port 58 at the bottom position. This flanged port is then filled with pre-wet chopped fiberglass and a second layer of fiberglass mat or fabric is placed within the mold to the proper form against the jelled material.

When forming septic tanks, it is necessary to provide a small baffle 114 over the entrance port 84 and a large baffle 116 over the exit ports 80 and also to provide slots or tracks 118 and 120 within which the baffles 114 and 116 are readily inserted in the finished article. To do this, the metal mold 122 of the identical shape as the baffles 114 or 116 is now placed in position in the second layer of pre-wet fiberglass mat and the tracks or slots 118 and 120 are formed over the edges of the mold 122. The mold is then again rotated at 120 r.p.m. and heat again is pumped through the mold and this is continued until the material jells under the centrifugal force and finally solidifies into the finished tubular article.

In some cases, instead of making a single sandwich type of finished article with two fabric layers 124 and a layer of filler 112 therebetween, a multi-deck sandwich may be provided by rotating the mold with the second layer only momentarily and then slowing it immediately from 120 r.p.m. to 60 r.p.m. and spraying in a second filler and then speeding up the rotation momentarily to 120 r.p.m. and slowing it down again and heating until it jells, similar to the first step. This may be repeated for as many filled layers and fabric layers as desired to build up as thick a sandwich as desired and then with the final fabric, the rotation and heat are continued until all the jelled material solidifies.

The completed article is then removed by disassembling first the flange-forming mold 62 and then the mold halves 52 permitting the tubular article, whether tapered or cylindrical, to be readily removed from the mold. In the meantime, a flanged bottom wall 126 and a flanged cover cap 128 and a cleanout plug 130 with a cover cap 128 and small baffle 114 and large baffle 116 are separately formed by hand of the same materials.

In the case of the baffle members 114 and 116, the same metal mold 122 can be used that was used for forming the trackways 118 for these baffles can be readily removed therefrom when finished because of their nesting shape. They are made in a similar manner, by hand, except for the use of centrifugal force, a first layer of pre-wet fabric, a layer of pre-wet filler sprayed thereon subjected to heat until it jells, then a second layer of pre-wet glass fiber fabric and then subjected to heat until the mold jells and then solidifies.

The bottom wall 126 is made similarly in a suitable shaped metal mold and has a lip 132 cooperating with the end of the tubular article 82. It will be noted that the lip 132 is slightly thinner than the bottom wall 126. The bottom wall 126 is secured onto the tubular article 82 in making the tank by laying an annular pre-wet fiberglass strip 132 to overlap the meeting edges of the tubular article 82 and bottom wall 126 and then subjected to heat until it jells and solidifies thus adhering the bottom wall 126 to the tubular article 82 and forming a tank.

Inasmuch as the septic tank when placed in position has the bottom wall 126 resting on the bottom of the septic tank excavation, the bottom wall 126 made as thus described is of sufficient strength, but the top cover 128 has to be somewhat stronger inasmuch as it usually supports a layer of earth thereover from one foot up to three feet in thickness. Although this top cover 128 is made in the same manner, instead of using fiberglass mat or fabric, basket woven pre-wet strips at 136 as shown in FIG. 18, are used in making the two outer layers of the sandwich with the inner layer of pre-wet filler, all pre-wet for forming the top can 128 and the cleanout plug 130 is made in a similar manner to fit the opening provided therefor.

It will be understood that heated air causing the thermosetting polyester resin to first jell and then ultimately to solidify, is turned off as needed in controlling the action as needed and first providing the jelled condition and then providing the solidified state. Also, for different diameter tubular articles, greater or lesser speeds of rotation will be necessary to provide the desired amount of centrifugal force in the rotation.

When the septic tank is tapered by being made in the tapered molds 44 or 48, the tapered septic tank is provided as shown at 138 in FIGS. 14 and 15. However, the tapered tank has great advantages for storage and shipping purposes, as shown in FIG. 15, for by omitting the cover caps 128 and the baffles 114 and 116 until the septic tank 138 has been delivered to its location, tapered septic tanks 138 may be nested in each other as illustrated in FIG. 15 for storage or shipping purposes.

Even in a 750 gallon size, the tapered septic tank or a cylindrical septic tank weighs only 150 pounds. As many as twenty septic tanks may be shipped at one time on a flat bed trailer and be towed by a three-quarter ton pickup truck, for twenty tanks weigh only one and one-half tons, as compared to a single concrete tank of the same capacity weighing two and one-half tons and thus needing a heavier trailer or truck to deliver a single concrete tank. Furthermore, with a concrete tank, a derrick must be used in handling the tank to and from the shipping truck or trailer and also in installing the tank in its underground installation, all of which is fairly expensive particularly as compared to the lightweight tank of this invention which may be handled manually by one or two men even in its heaviest sizes and may be installed manually without the need of a derrick, thus saving considerably in shipping and handling costs.

In the single sandwich form that is, two layers of fabric with a filler sandwich therebetween, the wall thickness is approximately three-sixteenths of an inch thick in the tank and in the bottom wall and cover cap while the lips on the bottom wall and on the cover cap are approximately one-eighth inch in thickness. The baffles are, likewise, of comparable thickness. Then the tapered tanks 138 are shipped in nested form, the cover caps 128 are left off and, likewise, the baffles 114 and 116 are left off and are packaged separately although it is apparent and obvious that the baffles could be packaged in the topmost tapered tank 138.

When at location, the baffles 114 and 116 have their edges snapped into the slots 118 which is sufficient to hold them permanently in position, and the cover cap 128 is merely placed on the top edge of the tank, no permanent securing being needed between the top cover 128 and the tank 82 or 138, for in use the weight of the one to three feet of earth thereover will hold it firmly in place and similarly will hold the cleanout plug 130 firmly in place yet readily removable therefrom when necessary when it is uncovered for cleaning purposes. The entrance flanged port 84 will be connected up to the plumbing from the house, while the three flanged exit ports 80 will each be connected to a separate drain line leading out into the drain field. The tanks 82 and 138 made of this material according to the method of this invention are non-corrosive, and are so lightweight and strong that installation costs are reduced to a minimum.

Although metal septic tanks are well known, metal tanks are subject to corrosion and tend to react and rust due to the sewage materials that are treated therein while the molded sandwich fiberglass and thermosetting polyester resin of this invention is extremely corrosion-proof. In the three customary sizes in which such tanks are often made, the three hundred gallon tank of this invention with a diameter of fifty-two inches and a depth of forty-two inches weighs approximately ninety pounds, a five hundred gallon tank with a diameter of fifty-two inches and a depth of sixty-four inches weighs one hundred pounds, and a seven hundred fifty gallon tank with a diameter of sixty inches and a depth of seventy-two inches weighs only one hundred and fifty pounds.

This invention has been described as being particularly intended for making septic tanks, but is also obviously useful in making anti-corrosive tubular articles such as pipes which may range in diameter from as little as sixteen inches to as large as ten feet and may be made in sections as long as twenty feet. If greater strength is necessary when the invention is made in the form of pipes, it may be made in a form of a multi-deck sandwich with multiple layers of fiberglass fabric and fillers between each as hereinbefore described. If even greater strength is desired, the fiberglass fabric for the pipe may be in the form of the basket-weave shown at 136 in FIG. 18 so that practically any desired strength may be built into the tubular pipe made according to this invention. Obviously, when tubular pipes are the end products, a tubular mold may be used without any port flanges, thus simplifying the mold when it is used principally for making pipes. However, cylindrical molds at 52 may be used for making tubular articles such as pipes with no ports in the sides thereof, by merely plugging the port molds as described hereinbefore.

In the drawings, like numbers refer to like parts, and for the purposes of explication, listed below are the numbered parts of the improved method for making molded sandwich tubular septic tanks and other molded tubular articles of this invention:

10—mandrel
12—framework
16—fixed standard
18—bolt and nut
20—slot
22—bench
24—motor
26—pulley belt
28—pulley wheel
30—power wheel
32—rubber tire
34—other cradle wheels
36—wheel axles
38—cylindrical mold
40—tracks on mold
42—framework recess
44—tapered mold
46—tracks on 44
48—other tapered mold
50—built up track on 48
52—mold halves
54—apertured cleats
56—bolt and nut for 54
58—single flanged port mold
60—flange mold half
62—complete flange mold
64—offset edge of 62
66—edge recess
68—pair of pivot bosses in 52
70—pivot in 68
72—pivot bolt on 70
74—wing nut on 72
76—port mold, whole
78—port mold, half
80—three flanged ports
82—tank of tubular member
84—single flange port
86—plug
88—supporting arm on 86
90—bridge plate for 88 and 86
92—bolt
94—threaded boss
96—threaded aperture in 94
98—cup shaped mold
100—lip on 98
102—flange on 100
104—bridge plate for 98
106—bolt for 104
108—wax mold release
110—1st layer of fabric
112—filler
114—small baffle
116—large baffle
118—slots for 114

120—slots for 118
122—metal baffle mold
124—last fabric layer
126—flanged bottom wall
128—flanged cover cap
130—cleanout plug
132—lip on bottom 126
134—fabric strip 126 to 82
136—basket weave strips
138—tapered septic tank Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. The method of molding a tubular object comprising lining a tubular rotatable mold with a wax mold release, then lining the mold with a layer of fiberglass fabric of a desired thickness that has been pre-wetted with thermosetting polyester resin to the approximate shape thereof, momentarily rotating the mold at a high speed to eliminate air pockets in and between the fabric, then continuing the rotation but at a slow speed and then adding a layer of similarly pre-wet fiberless filler of a desired thickness to the pre-wet fabric, then increasing the speed of rotation and pumping hot air into the mold until the material jells, stopping the hot air and stopping the rotation of the mold, adding a second layer of similarly pre-wet fiberglass fabric of desired thickness therewithin to the approximate desired shape, then heating and rotating the mold, adding a second layer of similarly pre-wet the second layer of fabric into the filler layer and continuing the heat and rotation until the material solidifies, then releasing the tank body from the mold.

2. The method of claim 1, and adding a bottom wall thereto hand formed of similar succesive layers of pre-wet fiberglass fabric, fiberless filler and pre-wet fiberglass fabric, thereby converting the tubular object to a tank.

3. The method of claim 2, including the step of providing outwardly flanged ports in the tank on substantially diametrically opposite sides, the mold having appropriately positioned outwardly flanged circular openings on substantially diametrically opposite sides, and removably securing capped plugs of a sufficiently smaller diameter to provide a suitably annular space therebetween to receive pre-wet material therein to form the flanged ports, the annular flange space on one diametric side being formed by pre-wet chopped fiberglass along with the first fabric layer, the other flange on the opposite diametric side being formed along with the second fabric layer.

4. A method of forming a nestable tapered septic tank having outwardly extending flanged ports in its tubular wall comprising first forming the tubular wall by utilizing a tubular tapered mold rotatable about a horizontal axis having diametrically oppositely disposed appropriately positioned and sized flanged openings in the tubular wall thereof, securing cup molds in the flanged openings of a size to provide suitable port flange-providing annular mold spaces therebetween, lining the tank and the cup molds with suitable mold release, then lining the tank mold with a uniform layer of desired thickness of fiberglass fabric pre-wet with thermosetting polyester resin and filling one of the port flange-providing annular mold spaces with similarly pre-wet chopped fiberglass after such port flange-providing annular mold space has been rotated to a bottom position, rotating the mold momentarily at high speed to eliminate air pockets between mold and material and then at low speed, and adding a layer of similarly pre-wet fiberless filler to the rotating inner surface of the fabric and then heating and speeding up the mold rotation until the materials jell, stopping the heat and rotation of the mold and then adding a similar pre-wet layer of fiberglass fabric about the inner surface, filling another of the flange-providing annular spaces with pre-wet chopped fiberglass while such other port flange-providing space is in a bottom position and also placing baffle receiving slot forming mold forms on such inner surface over the flanged openings, then heating and rotating the mold at such high speed that centrifugal force forces the second fabric layer into the filler and continuing the heat and rotation until the material jells and solidifies, then removing the tubular wall from the mold, and then providing baffles to fit the baffle slots and also providing top and bottom flanged covers, all made of a similar sandwich of pre-wet fiberglass fabric, filler and fabric and subsequently attaching the bottom cover with a similarly pre-wet fiberglass strip.

5. A method of providing tanks at desired locations comprising making the tanks at one location according to the method of claim 4, leaving the baffles and top covers separate thereby permitting nesting of the tapered tanks while being transported, then inserting the baffles in their slots and adding top covers at the desired locations.

References Cited by the Examiner
UNITED STATES PATENTS

| | | | |
|---|---|---|---|
| 1,622,012 | 3/1927 | McG. Ure | 264—311 |
| 2,102,968 | 12/1937 | Overad | 264—308 |
| 2,553,885 | 5/1951 | Van Orman et al. | 210—532 X |
| 2,614,058 | 10/1952 | Francis. | |
| 2,624,072 | 1/1953 | Delacoste et al. | 264—310 |
| 2,695,256 | 11/1954 | De Olloqui et al. | |
| 2,739,917 | 3/1956 | Schulze. | |
| 2,748,045 | 5/1956 | Kelly. | |
| 2,773,287 | 12/1956 | Stout. | |
| 2,847,714 | 8/1958 | Sullivan | 264—257 |
| 2,945,531 | 7/1960 | Balcom et al. | |
| 2,994,919 | 8/1961 | Schafer et al. | 264—308 |
| 3,012,922 | 12/1961 | Wiltshire. | |
| 3,031,083 | 4/1962 | Schreiber | 210—532 |
| 3,040,384 | 6/1962 | Whittington | 264—310 |
| 3,072,965 | 1/1963 | Miller | 18—26 |
| 3,097,166 | 7/1963 | Monson | 210—532 X |
| 3,109,813 | 11/1963 | Bergsten et al. | 210—532 |
| 3,173,175 | 3/1965 | Lemelson | 18—26 |

ROBERT F. WHITE, *Primary Examiner.*
RUBEN FRIEDMAN, *Examiner.*
J. DECESARE, S. A. HELLER, *Assistant Examiners.*